(12) United States Patent
Furukawa

(10) Patent No.: US 9,503,534 B2
(45) Date of Patent: Nov. 22, 2016

(54) INFORMATION DISTRIBUTION SYSTEM

(75) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 13/639,721

(22) PCT Filed: Jan. 12, 2011

(86) PCT No.: PCT/JP2011/000080
§ 371 (c)(1),
(2), (4) Date: Oct. 5, 2012

(87) PCT Pub. No.: WO2011/132345
PCT Pub. Date: Oct. 27, 2011

(65) Prior Publication Data
US 2013/0031167 A1    Jan. 31, 2013

(30) Foreign Application Priority Data
Apr. 23, 2010   (JP) .................................. 2010-099344

(51) Int. Cl.
*G06F 15/16* (2006.01)
*H04L 29/08* (2006.01)
(Continued)

(52) U.S. Cl.
CPC .............. *H04L 67/22* (2013.01); *G06Q 30/02* (2013.01); *G06Q 30/0603* (2013.01); *H04W 4/028* (2013.01); *H04W 4/20* (2013.01)

(58) Field of Classification Search
None
See application file for complete search history.

(56) References Cited

U.S. PATENT DOCUMENTS

| 2003/0046159 A1* | 3/2003 | Ebrahimi | G06Q 30/0277 705/14.73 |
| 2003/0163359 A1 | 8/2003 | Kanesaka | |

(Continued)

FOREIGN PATENT DOCUMENTS

| CN | 1596521 A | 3/2005 |
| CN | 101127941 A | 2/2008 |

(Continued)

OTHER PUBLICATIONS

International Search Report of PCT/JP2011/000080 dated Feb. 15, 2011.

(Continued)

*Primary Examiner* — Chris Parry
*Assistant Examiner* — Stephen Houlihan
(74) *Attorney, Agent, or Firm* — Sughrue Mion, PLLC

(57) ABSTRACT

A system includes a server device and a plurality of user terminals. Each of the user terminals transmits a provisional user identifier, a group identifier, and activity information representing an activity of a user to the server device. For each of the received activity information, the server device selects distribution information based on the activity information, and also generates combination information including the distribution information and the provisional user identifier received with the activity information. The server device transmits a distribution information list including the combination information generated based on the activity information received with the group identifier, to each of the user terminals associated with the group identifier. Each of the user terminals acquires the distribution information included in the combination information including the provisional user identifier in the received distribution information list.

9 Claims, 20 Drawing Sheets

(51) Int. Cl.
*G06Q 30/02* (2012.01)
*G06Q 30/06* (2012.01)
*H04W 4/02* (2009.01)
*H04W 4/20* (2009.01)

(56) References Cited

U.S. PATENT DOCUMENTS

| | | | |
|---|---|---|---|
| 2003/0228908 A1* | 12/2003 | Caiafa et al. | 463/42 |
| 2006/0271449 A1 | 11/2006 | Oliver et al. | |
| 2007/0019609 A1* | 1/2007 | Anjum | 370/349 |
| 2008/0045192 A1* | 2/2008 | Zhao et al. | 455/414.2 |
| 2011/0066608 A1* | 3/2011 | Graham et al. | 707/708 |
| 2011/0075191 A1* | 3/2011 | Meunier | G06Q 10/107 |
| | | | 358/1.15 |

FOREIGN PATENT DOCUMENTS

| | | | |
|---|---|---|---|
| JP | 2003-256713 A | 9/2003 | |
| JP | 2004-213287 A | 7/2004 | |

OTHER PUBLICATIONS

Communication dated Apr. 23, 2015 from the State Intellectual Property Office of the People's Republic of China in counterpart application No. 201180020199.9.

* cited by examiner

Fig.8

| USER ID | MOBILE PHONE NUMBER | NAME | GENDER | AGE | GROUP ID |
|---|---|---|---|---|---|
| 1 | 09012345678 | TARO YAMADA | MALE | 15 | |
| 2 | 09098765432 | HANAKO YAMADA | FEMALE | 27 | |
| 3 | 09043219876 | TARO SATO | MALE | 39 | |
| 4 | 09011112222 | HANAKO SATO | FEMALE | 16 | |
| 5 | 09033445566 | TARO SUZUKI | MALE | 14 | |
| ... | ... | ... | ... | ... | |

Fig.9

| USER ID | MOBILE PHONE NUMBER | NAME | GENDER | AGE | GROUP ID |
|---|---|---|---|---|---|
| 1 | 09012345678 | TARO YAMADA | MALE | 15 | 1 |
| 2 | 09098765432 | HANAKO YAMADA | FEMALE | 27 | 1 |
| 3 | 09043219876 | TARO SATO | MALE | 39 | 1 |
| 4 | 09011112222 | HANAKO SATO | FEMALE | 16 | 2 |
| 5 | 09033445566 | TARO SUZUKI | MALE | 14 | 2 |
| ... | ... | ... | ... | ... | ... |

Fig.10

| GROUP ID | PROVISIONAL USER ID |
|---|---|
| 1 | xMpCOKC5I4INzFCab3WEmw |

Fig.11

| DATA ID | TIME | LATITUDE | LONGITUDE |
|---|---|---|---|
| 1 | 2009/11/10 10:30 | +35.651 | +139.701 |
| 2 | 2009/11/10 10:35 | +35.651 | +139.700 |
| 3 | 2009/11/10 10:40 | +35.652 | +139.700 |
| 4 | 2009/11/10 10:45 | +35.651 | +139.701 |
| 5 | 2009/11/10 10:50 | +35.651 | +139.702 |
| 6 | 2009/11/10 10:55 | +35.650 | +139.702 |

Fig.12

| GROUP ID | PROVISIONAL USER ID | TIME | LATITUDE | LONGITUDE |
|---|---|---|---|---|
| 1 | xMpCOKC5I4INzFCab3WEmw | 2009/11/10 10:55 | +35.650 | +139.702 |
| 1 | yB5yjZ1ML2NvBn+JzBSGLA | 2009/11/10 10:55 | +35.691 | +139.699 |
| 1 | 7MvIfktc4v4oMI/Z8qe68w | 2009/11/10 10:55 | +35.673 | +139.695 |
| 2 | qH/2eaLz5x2RgaZ7dUISLA | 2009/11/10 10:55 | +35.711 | +139.712 |
| 2 | 5No7f7vOI0XXdysGdKMY1Q | 2009/11/10 10:55 | +35.651 | +139.699 |

Fig.13

| LATITUDE LOWER LIMIT | LATITUDE UPPER LIMIT | LONGITUDE LOWER LIMIT | LONGITUDE UPPER LIMIT | DISTRIBUTION INFORMATION |
|---|---|---|---|---|
| 35.648 | 35.652 | 139.698 | 139.702 | SHIBUYA AREA INFORMATION |
| 35.688 | 35.692 | 139.698 | 139.702 | SHINJUKU AREA INFORMATION |
| 35.708 | 35.712 | 139.708 | 139.712 | IKEBUKURO AREA INFORMATION |
| 35.668 | 35.672 | 139.698 | 139.702 | HARAJUKU AREA INFORMATION |
| ... | ... | ... | ... | ... |

Fig.14

| GROUP ID | PROVISIONAL USER ID | DISTRIBUTION INFORMATION |
|---|---|---|
| 1 | xMpCOKC5I4INzFCab3WEmw | SHIBUYA AREA INFORMATION |
| 1 | yB5yjZ1ML2NvBn+JzBSGLA | SHINJUKU AREA INFORMATION |
| 1 | 7MvIfktc4v4oMI/Z8qe68w | IKEBUKURO AREA INFORMATION |
| 2 | qH/2eaLz5x2RgaZ7dUISLA | HARAJUKU AREA INFORMATION |
| 2 | 5No7f7vOI0XXdysGdKMY1Q | SHIBUYA AREA INFORMATION |

Fig.16

| GROUP ID | GENDER | AGE LOWER LIMIT | AGE UPPER LIMIT |
|---|---|---|---|
| 1 | MALE | 0 | 9 |
| 2 | MALE | 10 | 19 |
| 3 | MALE | 20 | 29 |
| 4 | MALE | 30 | 39 |
| 5 | MALE | 40 | 49 |
| 6 | MALE | 50 | 59 |
| 7 | MALE | 60 | 69 |
| 8 | MALE | 70 | 79 |
| 9 | MALE | 80 | 89 |
| 10 | MALE | 90 | 1000 |
| 11 | FEMALE | 0 | 9 |
| 12 | FEMALE | 10 | 19 |
| 13 | FEMALE | 20 | 29 |
| 14 | FEMALE | 30 | 39 |
| 15 | FEMALE | 40 | 49 |
| 16 | FEMALE | 50 | 59 |
| 17 | FEMALE | 60 | 69 |
| 18 | FEMALE | 70 | 79 |
| 19 | FEMALE | 80 | 89 |
| 20 | FEMALE | 90 | 1000 |

Fig.17

| USER ID | MOBILE PHONE NUMBER | NAME | GENDER | AGE | GROUP ID |
|---|---|---|---|---|---|
| 1 | 09012345678 | TARO YAMADA | MALE | 15 | 2 |
| 2 | 09098765432 | HANAKO YAMADA | FEMALE | 27 | 13 |
| 3 | 09043219876 | TARO SATO | MALE | 39 | 4 |
| 4 | 09011112222 | HANAKO SATO | FEMALE | 16 | 12 |
| 5 | 09033445566 | TARO SUZUKI | MALE | 14 | 2 |
| ... | ... | ... | ... | ... | ... |

Fig.18

| GENDER | AGE LOWER LIMIT | AGE UPPER LIMIT | LATITUDE LOWER LIMIT | LATITUDE UPPER LIMIT | LONGITUDE LOWER LIMIT | LONGITUDE UPPER LIMIT | DISTRIBUTION INFORMATION |
|---|---|---|---|---|---|---|---|
| MALE | 11 | 20 | 35.648 | 35.652 | 139.698 | 139.702 | FOR MALE TEENAGER SHIBUYA AREA INFORMATION |
| MALE | 11 | 20 | 35.688 | 35.692 | 139.698 | 139.702 | FOR MALE TEENAGER SHINJUKU AREA INFORMATION |
| MALE | 11 | 20 | 35.708 | 35.712 | 139.708 | 139.712 | FOR MALE TEENAGER IKEBUKURO AREA INFORMATION |
| MALE | 11 | 20 | 35.668 | 35.672 | 139.698 | 139.702 | FOR MALE TEENAGER HARAJUKU AREA INFORMATION |
| ... | | | ... | | | ... | ... |

Fig.19

| GROUP ID | PROVISIONAL USER ID | TIME | LATITUDE | LONGITUDE |
|---|---|---|---|---|
| 2 | xMpCOKC5I4INzFCab3WEmw | 2009/11/10 10:55 | +35.650 | +139.702 |
| 13 | yB5yjZ1ML2NvBn+JzBSGLA | 2009/11/10 10:55 | +35.691 | +139.699 |
| 4 | 7Mvlfktc4v4oMl/Z8qe68w | 2009/11/10 10:55 | +35.673 | +139.695 |
| 12 | qH/2eaLz5x2RgaZ7dUISLA | 2009/11/10 10:55 | +35.711 | +139.712 |
| 2 | 5No7f7vOI0XXdysGdKMY1Q | 2009/11/10 10:55 | +35.651 | +139.699 |

Fig.20

| GROUP ID | PROVISIONAL USER ID | DISTRIBUTION INFORMATION |
|---|---|---|
| 1 | xMpCOKC5I4INzFCab3WEmw | FOR MALE TEENAGER SHIBUYA AREA INFORMATION |
| 1 | yB5yjZ1ML2NvBn+JzBSGLA | FOR FEMALE TWENTIES SHINJUKU AREA INFORMATION |
| 1 | 7Mvlfktc4v4oMI/Z8qe68w | FOR MALE THIRTIES IKEBUKURO AREA INFORMATION |
| 2 | qH/2eaLz5x2RgaZ7dUISLA | FOR FEMALE TEENAGER HARAJUKU AREA INFORMATION |
| 2 | 5No7f7vOl0XXdysGdKMY1Q | FOR MALE TEENAGER SHIBUYA AREA INFORMATION | bution information selecting means for, for each of the
INFORMATION DISTRIBUTION SYSTEM

CROSS REFERENCE TO RELATED APPLICATIONS

This application is a National Stage of International Application No. PCT/JP2011/000080 filed Jan. 12, 2011, claiming priority based on Japanese Patent Application No. 2010-099344 filed Apr. 23, 2010, the contents of all of which are incorporated herein by reference in their entirety.

TECHNICAL FIELD

The present invention relates to an information distribution system that transmits distribution information from a server device to a user terminal.

BACKGROUND ART

An information distribution system that selects distribution information based on activity information representing an activity of a user and transmits the selected distribution information to a user terminal of the user is known (e.g., refer to Patent Document 1). Activity information is, for example, location information representing the location of a user terminal, purchasing information representing a product that a user has purchased, or the like.

A server device included by this information distribution system has a registrant file for registering users possessing user terminals, a purchasing history file in which purchasing histories are collected, a location information file (an activity pattern file) in which activities of registrants are collected by using GPS (Global Positioning System), and an advertisement request file including distribution information representing advertisement. This server device extracts a registrant of a target for transmission of distribution information representing advertisement based on the purchasing history file, the activity pattern file, and the advertisement request file.

According to this information distribution system, it is possible to transmit properly selected distribution information (i.e., offer "personalized service") to a user terminal based on the purchasing history of a user and the activity of the user.

[Patent Document 1] Japanese Unexamined Patent Application Publication No. 2003-256713

In the information distribution system described above, the server device is configured to store the registrant file, the purchasing history file and the activity pattern file in association with each other. That is to say, the server device stores information enabling specification of an individual as a user (e.g., private information such as a name and a telephone number) and activity information representing an activity of a user in association with each other. Therefore, there is a problem that an activity of a specific user may be known by a third party in a case that information is leaked from the server device.

SUMMARY

Accordingly, an object of the present invention is to provide an information distribution system that can solve the abovementioned problem, "when the server device transmits distribution information based on activities of users to user terminals, an activity of a specific user may be known by a third party in a case that information is leaked from the server device."

In order to achieve the object, an information distribution system as an exemplary embodiment of the present invention includes a server device and a plurality of user terminals connected so as to be capable of communicating with the server device.

Each of the user terminals includes: a provisional user identifier storing means for storing a provisional user identifier that is a provisional identifier for identifying a user; and an activity information transmitting means for transmitting the stored provisional user identifier, a group identifier for identifying a group including a plurality of users including the user of the user terminal, and activity information representing an activity of the user of the user terminal, to the server device.

The server device includes: an activity information receiving means for receiving the provisional user identifier, the group identifier, and the activity information; a distribution information selecting means for, for each of the received activity information, selecting distribution information based on the received activity information and also generating combination information including the selected distribution information and the provisional user identifier received with the activity information; and a distribution information list transmitting means for transmitting a distribution information list including the combination information generated based on the activity information received with the group identifier, to each of the user terminals associated with the group identifier.

Each of the user terminals further includes a distribution information acquiring means for receiving the distribution information list and acquiring the distribution information included in the combination information including the stored provisional user identifier from among the combination information included in the received distribution information list.

Further, an information distribution method as another exemplary embodiment of the present invention is a method applied to an information distribution system including a server device and a plurality of user terminals connected so as to be capable of communicating with the server device.

The information distribution method includes: by each of the user terminals, transmitting a provisional user identifier stored in a storage device for storing a provisional user identifier that is a provisional identifier for identifying a user, a group identifier for identifying a group including a plurality of users including the user of the user terminal, and activity information representing an activity of the user of the user terminal, to the server device; by the server device, receiving the provisional user identifier, the group identifier, and the activity information; by the server device, for each of the received activity information, selecting distribution information based on the received activity information and also generating combination information including the selected distribution information and the provisional user identifier received with the activity information; by the server device, transmitting a distribution information list including the combination information generated based on the activity information received with the group identifier, to each of the user terminals associated with the group identifier; and by each of the user terminals, receiving the distribution information list and acquiring the distribution information included in the combination information including the stored provisional user identifier from among the combination information included in the received distribution information list.

Further, a server device as another exemplary embodiment of the present invention is a device connected so as to be capable of communicating with each of a plurality of user terminals.

The server device includes: an activity information receiving means for receiving a provisional user identifier that is a provisional identifier for identifying a user, a group identifier for identifying a group including a plurality of users, and activity information representing an activity of the user; a distribution information selecting means for, for each of the received activity information, selecting distribution information based on the received activity information and also generating combination information including the selected distribution information and the provisional user identifier received with the activity information; and a distribution information list transmitting means for transmitting a distribution information list including the combination information generated based on the activity information received with the group identifier, to each of the user terminals associated with the group identifier.

Further, a recording medium as another exemplary embodiment of the present invention is a computer-readable recording medium storing an information distribution program including instructions for causing a server device connected so as to be capable of communicating with each of a plurality of user terminals, to realize:

an activity information receiving means for receiving a provisional user identifier that is a provisional identifier for identifying a user, a group identifier for identifying a group including a plurality of users, and activity information representing an activity of a user;

a distribution information selecting means for, for each of the received activity information, selecting distribution information based on the received activity information and also generating combination information including the selected distribution information and the provisional user identifier received with the activity information; and a distribution information list transmitting means for transmitting a distribution information list including the combination information generated based on the activity information received with the group identifier, to each of the user terminals associated with the group identifier.

Further, a user terminal as another exemplary embodiment of the present invention is a user terminal connected so as to be capable of communicating with a server device.

The user terminal includes: a provisional user identifier storing means for storing a provisional user identifier that is a provisional identifier for identifying a user; an activity information transmitting means for transmitting the stored provisional user identifier, a group identifier for identifying a group including a plurality of users including the user of the user terminal, and activity information representing an activity of the user of the user terminal, to the server device; and a distribution information acquiring means for receiving a distribution information list including a plurality of combination information each including a provisional user identifier and distribution information from the server device, and acquiring distribution information included in combination information including the stored provisional user identifier from among the combination information included in the received distribution information list.

Further, a recording medium as another exemplary embodiment of the present invention is a computer-readable recording medium storing an information acquisition program including instructions for causing a user terminal connected so as to be capable of communicating with a server device, to realize:

a provisional user identifier storage processing means for causing a storage device to store a provisional user identifier that is a provisional identifier for identifying a user;

an activity information transmitting means for transmitting the stored provisional user identifier, a group identifier for identifying a group including a plurality of users including the user of the user terminal, and activity information representing an activity of the user of the user terminal, to the server device; and a distribution information acquiring means for receiving a distribution information list including a plurality of combination information each including a provisional user identifier and distribution information from the server device and acquiring distribution information included in combination information including the stored provisional user identifier from among the combination information included in the received distribution information list.

With the configurations of the present invention as described above, even when information is leaked from the server device, it is possible to transmit distribution information based on activities of users to user terminals while preventing a third party from knowing an activity of a specific user.

BRIEF DESCRIPTION OF DRAWINGS

FIG. 8 is a table showing information stored by a user ID storing part according to the second exemplary embodiment of the present invention;

FIG. 9 is a table showing information stored by the user ID storing part according to the second exemplary embodiment of the present invention;

FIG. 10 is a table showing information stored by a provisional user ID storing part according to the second exemplary embodiment of the present invention;

FIG. 11 is a table showing information stored by an activity information storing part of a user terminal according to the second exemplary embodiment of the present invention;

FIG. 12 is a table showing information stored by an activity information storing part of a server device according to the second exemplary embodiment of the present invention;

FIG. 13 is a table showing information stored by a distribution information storing part according to the second exemplary embodiment of the present invention;

FIG. 14 is a table showing information stored by a combination information storing part according to the second exemplary embodiment of the present invention;

FIG. 16 is a table showing information stored by a group ID condition storing part according to the third exemplary embodiment of the present invention;

FIG. 17 is a table showing information stored by a user ID storing part according to the third exemplary embodiment of the present invention;

FIG. 18 is a table showing information stored by a distribution information storing part according to the third exemplary embodiment of the present invention;

FIG. 19 is a table showing information stored by an activity information storing part of a server device according to the third exemplary embodiment of the present invention;

FIG. 20 is a table showing information stored by a combination information storing part according to the third exemplary embodiment of the present invention.

EXEMPLARY EMBODIMENTS

Below, the respective exemplary embodiments of an information distribution system, an information distribution method, a server device, a recording medium and a user terminal according to the present invention will be described with reference to FIGS. 1 to 21.

First Exemplary Embodiment

Configuration

Figure 1:
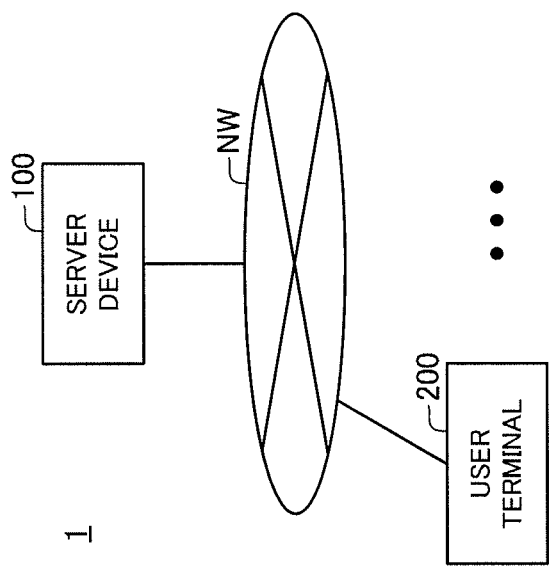
FIG. 1 is a view showing a schematic configuration of an information distribution system according to a first exemplary embodiment of the present invention.

As shown in FIG. 1, an information distribution system 1 according to a first exemplary embodiment includes a server device 100, and a plurality of user terminals 200 . . . . The respective user terminals 200 . . . are connected with the server device 100 via a communication line NW (in this exemplary embodiment, a communication line configuring an IP (Internet Protocol) network).

The server device 100 is an information processing device. The server device 100 includes a central processing unit (CPU) and a storage device (a memory and a hard disk drive (HDD)), which are not shown in the drawings. The server device 100 is configured to realize functions described later by the CPU's execution of a program stored in the storage device.

Each of the user terminals 200 . . . is a mobile phone. Alternatively, each of the user terminals 200 . . . may be a personal computer, a PHS (Personal Handyphone System), a PDA (Personal Data Assistance, Personal Digital Assistant), a car navigation terminal, a game terminal, or the like.

Each of the user terminals 200 . . . includes a CPU, a storage device (in this exemplary embodiment, a memory), an input device and an output device, which are not shown in the drawings. The output device has a display. The output device causes the display to display an image composed of characters and figures based on image information outputted from the CPU.

The input device has a plurality of key-type buttons (keys). Each of the user terminals 200 . . . is configured so that information based on a user's operation is inputted via the keys. Each of the user terminals 200 . . . is configured to realize functions described later by the CPU's execution of a program stored in the storage device.

(Function)

Figure 2:
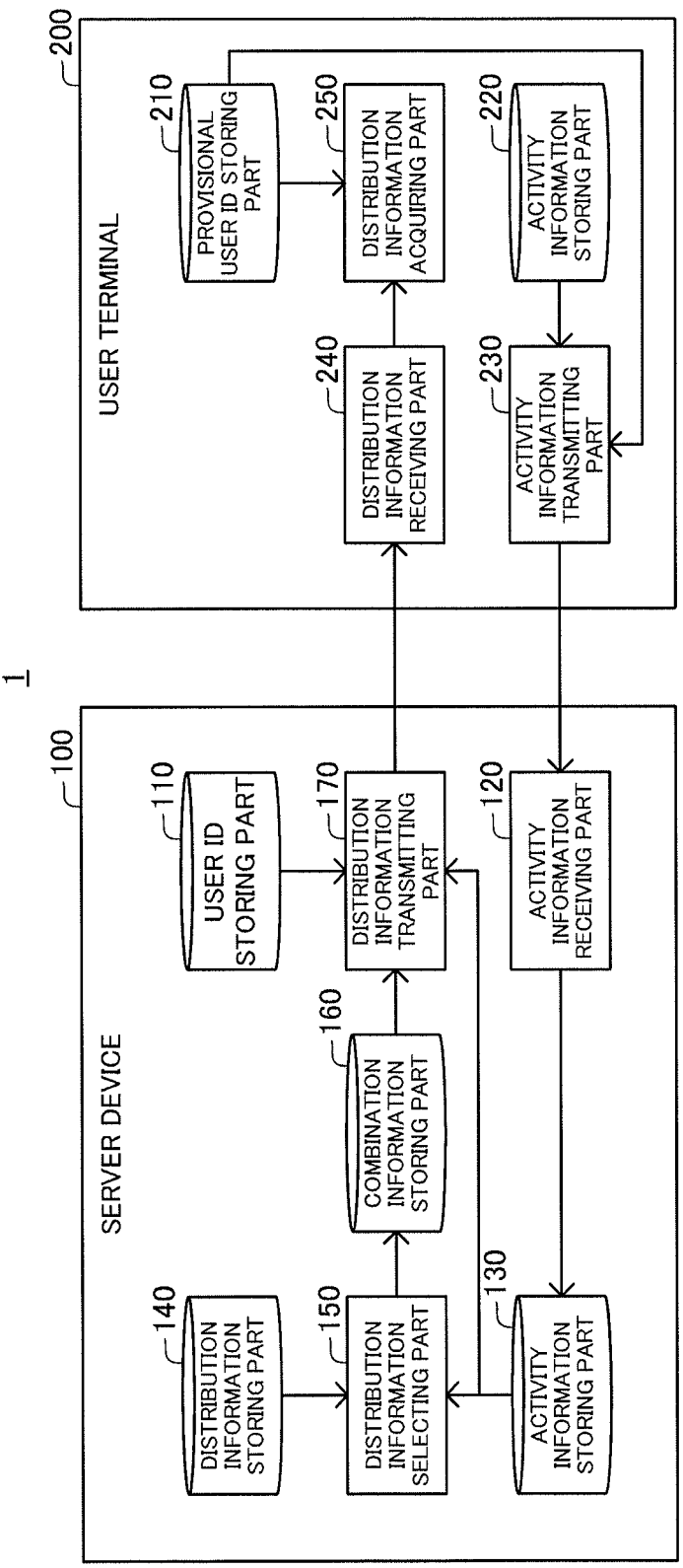
FIG. 2 is a block diagram schematically showing a function of the information distribution system according to the first exemplary embodiment of the present invention.

FIG. 2 is a block diagram showing a function of the information distribution system 1 configured as described above.

A function of the server device 100 includes a user ID storing part (a terminal specification information storing means, a terminal specification information storage processing means) 110, an activity information receiving part (an activity information receiving means) 120, an activity information storing part 130, a distribution information storing part 140, a distribution information selecting part (a distribution information selecting means) 150, a combination information storing part 160, and a distribution information transmitting part (a distribution information list transmitting means) 170.

The user ID storing part 110 stores (i.e., causes the storage device to store) a user identifier (user ID), a group identifier (group ID) and transmission destination user terminal information (terminal specification information) in association with each other.

User ID is an identifier (identification information) for identifying a user. Group ID is an identifier for identifying a group including a plurality of users including the user identified by the abovementioned user ID associated with the group ID. Transmission destination user terminal information is information for specifying a user terminal of the user identified by the abovementioned user ID associated with the transmission destination user terminal information.

The activity information receiving part 120 receives a provisional user identifier (provisional user ID), group ID and activity information transmitted by each of the user terminals 200 . . . . Provisional user ID is a provisional identifier for indentifying a user.

Activity information is information representing an activity of a user of each of the user terminals 200 . . . . For example, activity information is location information representing the location of each of the user terminals 200 . . . , TV viewing information representing a television program that the user has viewed, Web viewing information representing a website that the user has viewed, purchasing information representing a product that the user has purchased, or the like.

The activity information storing part 130 stores provisional user ID, group ID and activity information received by the activity information receiving part 120 in association with each other.

The distribution information storing part 140 previously stores distribution information. In this exemplary embodiment, distribution information is content (e.g., information including strings, sounds and/or images).

The distribution information selecting part 150 selects, for each of the activity information stored in the activity information storing part 130, distribution information from among the distribution information stored in the distribution information storing part 140. At this moment, the distribution information selecting part 150 selects distribution information based on the activity information stored in the activity information storing part 130.

The distribution information selecting part 150 generates, for each of the activity information stored in the activity information storing part 130, combination information including the selected distribution information and the provisional user ID stored in the activity information storing part 130 in association with the activity information based on which the distribution information has been selected.

The combination information storing part 160 stores the combination information generated by the distribution information selecting part 150 in association with the group ID stored in the activity information storing part 130 in association with the activity information based on which the combination information has been generated.

The distribution information transmitting part 170 executes processes (1) to (3) described below on group ID to be processed:
(1) generate a distribution information list including the combination information stored in the combination information storing part 160 in association with the group ID to be processed;
(2) acquire the transmission destination user terminal information stored in the user ID storing part 110 in association with the group ID to be processed; and
(3) transmit the distribution information list generated for the group ID to be processed to each of the user terminals 200 . . . specified by the transmission destination user terminal information acquired in the process (2).

In this exemplary embodiment, when receiving a distribution request from each of the user terminals 200 . . . , the distribution information transmitting part 170 executes the processes described above on the group ID stored in the user ID storing part 110 in association with user ID included in the distribution request.

The server device 100 is configured to use previously stored distribution information as distribution information included in the distribution information list in this exemplary embodiment, but may be configured to newly generate distribution information included in the distribution information list.

A function of the user terminal 200 includes a provisional user ID storing part (a provisional user identifier storing means, a provisional user identifier storage processing means) 210, an activity information storing part 220, an activity information transmitting part (an activity information transmitting means) 230, a distribution information receiving part (part of a distribution information acquiring means) 240, and a distribution information acquiring part (part of the distribution information acquiring means) 250. A user terminal other than the user terminal 200 has the same function as the user terminal 200, and operates in the same manner as the user terminal 200.

The provisional user ID storing part 210 stores group ID and provisional user ID. In this exemplary embodiment, the user terminal 200 generates provisional user ID. The provisional user ID storing part 210 stores (i.e., causes the storage device to store) the generated provisional user ID.

The activity information storing part 220 acquires activity information. In this exemplary embodiment, the activity information storing part 220 acquires activity information based on information inputted by a user. The activity information storing part 220 stores the acquired activity information.

The activity information transmitting part 230 transmits, to the server device 100, the activity information stored in the activity information storing part 220, the group ID stored in the provisional user ID storing part 210, and the provisional user ID stored in the provisional user ID storing part 210.

The distribution information receiving part 240 receives the distribution information list from the server device 100.

The distribution information acquiring part 250 acquires distribution information included in combination information including the provisional user ID stored in the provisional user ID storing part 210 from among the combination information included in the distribution information list received by the distribution information receiving part 240. Then, the distribution information acquiring part 250 outputs the acquired distribution information via the output device (Operation)

Next, an operation of the information distribution system 1 described above will be explained with reference to a flowchart shown in FIG. 3.

Assuming the user ID storing part 110 of the server device 100 stores user ID, group ID and transmission destination user terminal information in association with each other and the provisional user ID storing part 210 of the user terminal 200 stores provisional user ID and group ID, the explanation will be continued.

At first, the user terminal 200 transmits the activity information stored in the activity information storing part 220 and the group ID and the provisional user ID stored in the provisional user ID storing part 210, to the server device 100 (step A1).

Thus, the server device 100 receives the activity information, the group ID and the provisional user ID, and causes the activity information storing part 130 to store the provisional user ID, the group ID and the activity information having been received in association with each other (step A2).

Next, for each of the activity information stored in the activity information storing part 130, the server device 100 selects, based on the activity information, distribution information from among the distribution information stored in the distribution information storing part 140 (step A3). For example, the server device 100 selects distribution information by the method described in Patent Document 1.

Then, for each of the activity information stored in the activity information storing part 130, the server device 100 generates combination information including the selected distribution information and the provisional user ID stored in the activity information storing part 130 in association with the activity information based on which the distribution information has been selected (step A4). Next, the server device 100 causes the combination information storing part 160 to store the generated combination information and the group ID stored in the activity information storing part 130 in association with the activity information based on which the combination information has been generated.

After that, the server device 100 generates a distribution information list including the combination information stored in the combination information storing part 160 in association with the group ID to be processed (step A5). Then, the server device 100 transmits (in this exemplary embodiment, pushes) to each of the user terminals 200 . . . specified by the transmission destination user terminal information stored in the user ID storing part 110 in association with the group ID to be processed (step A6).

Thus, the user terminal 200 receives the distribution information list from the server device 100. The user terminal 200 acquires the distribution information included in one of the combination information included in the received distribution information list (step A7). Then, the user terminal 200 outputs the acquired distribution information via the output device.

Next, an operation of the server device 100 for generating a distribution information list at step A5 of FIG. 3 will be described in detail with reference to a flowchart shown in FIG. 4.

In this exemplary embodiment, the server device 100 receives a distribution request including user ID from each of the user terminals 200 . . . . Then, the server device 100 acquires the user ID included in the distribution request (step B1).

Next, the server device 100 acquires group ID stored in the user ID storing part 110 in association with the acquired user ID (step B2). Then, the server device 100 acquires all of the combination information stored in the combination information storing part 160 in association with the acquired group ID (step B3). Next, the server device 100 generates a distribution information list including the acquired combination information (step B4).

Next, an operation of the user terminal 200 for acquiring distribution information at step A7 of FIG. 3 will be described in detail with reference to a flowchart shown in FIG. 5.

The user terminal 200 receives a distribution information list from the server device 100 (step C1). Then, the user terminal 200 acquires provisional user ID from the provisional user ID storing part 210 (step C2). Next, the user terminal 200 specifies combination information including the acquired provisional user ID from among combination information included in the received distribution information list.

Then, the user terminal 200 acquires distribution information included in the specified combination information (step C3). Next, the user terminal 200 outputs the acquired distribution information via the output device (step C4).

As described above, according to the information distribution system 1 in the first exemplary embodiment of the present invention, the server device 100 does not hold information for associating information (private information) that enables specification of an individual as a user with activity information. Therefore, even when information is leaked from the server device 100, it is possible to transmit distribution information based on activities of users to the user terminals 200 . . . while preventing a third party from knowing an activity of a specific user.

Further, the server device 100 generates a distribution information list for each group, and also transmits the generated distribution information list to each of the user terminals 200 . . . of users included in the group. Therefore, it is possible to prevent the data amount of the distribution information list from becoming too large.

Thus, according to the information distribution system 1 according to the first exemplary embodiment, it is possible to transmit distribution information depending on activities of users to the user terminals 200 . . . (i.e., offer personalized service) while protecting the privacy of users.

The server device 100 may be configured to transmit information representing an URI (Uniform Resource Identifier) as distribution information. In this case, the user terminal 200 transmits a request including an URI represented by acquired distribution information as a request URI, to the server device 100. The server device 100 transmits content to the user terminal 200 in response to this request.

Further, an information distribution system according a modified example of the first exemplary embodiment may be configured so that provisional user ID is changed every time a previously set change period elapses. In this case, because activity information are associated with each other less easily in the server device 100, it is possible to decrease a possibility that an individual is specified even when, for example, activity information are accumulated for a relatively long time.

Second Exemplary Embodiment

Next, an information distribution system according to a second exemplary embodiment of the present invention will be described. The information distribution system according to the second exemplary embodiment is different from the information distribution system according to the first exemplary embodiment in that the server device determines group ID. Therefore, a description will be made below focusing on the different point.

The information distribution system 1 in the second exemplary embodiment is a system configured so that the user terminal 200 transmits location information acquired by using GPS to the server device 100 and the server device 100 transmits distribution information of the vicinity of a location represented by the location information.
(Function)

Figure 6:
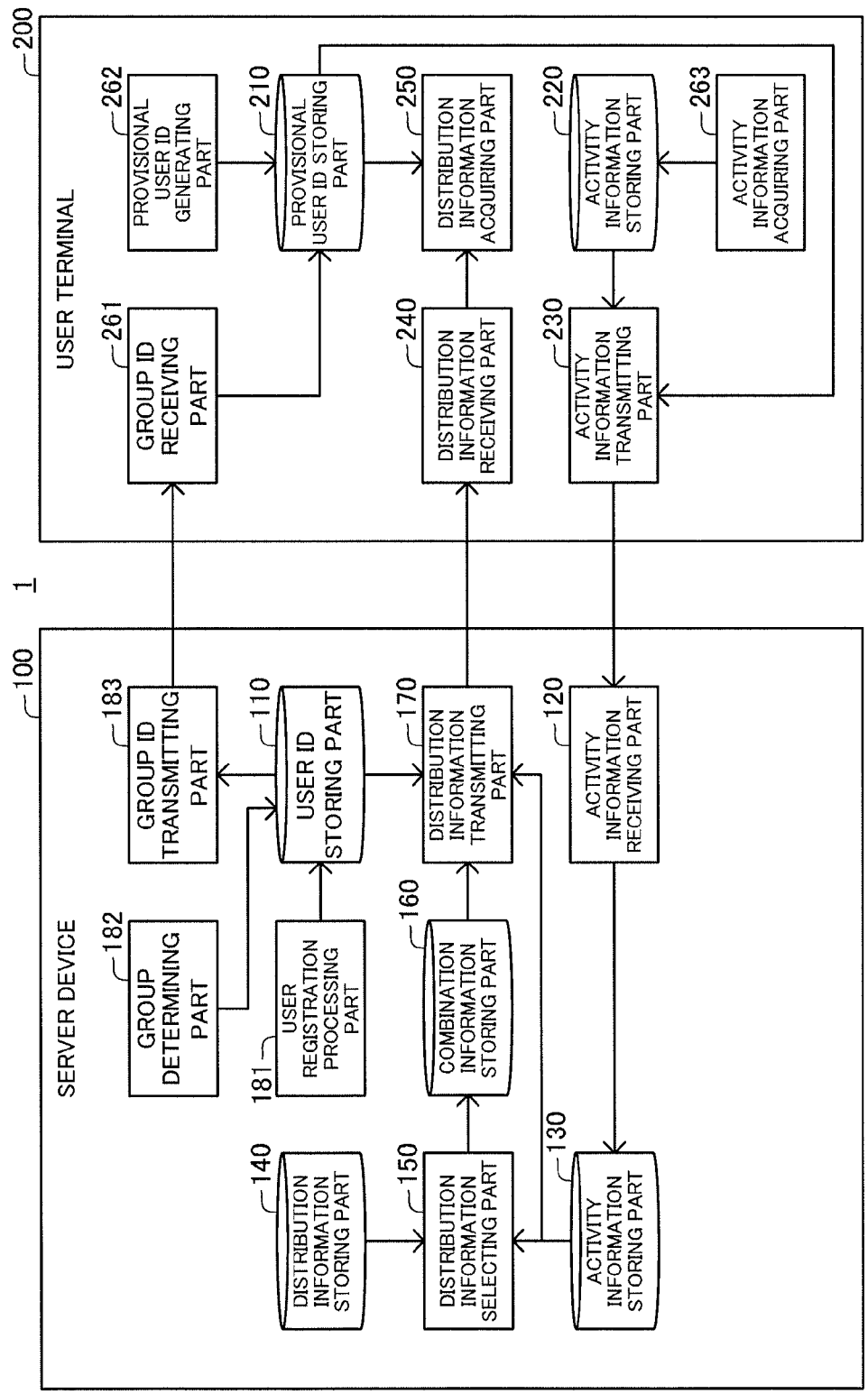
FIG. 6 is a block diagram schematically showing a function of an information distribution system according to a second exemplary embodiment of the present invention.

As shown in FIG. 6, a function of the server device 100 in the second exemplary embodiment includes a user registration processing part 181, a group determining part 182 and a group ID transmitting part 183 in addition to the function of the server device 100 in the first exemplary embodiment.

The user registration processing part 181 accepts user information inputted by a user of each of the user terminals 200 . . . . In this exemplary embodiment, user information includes an attribute (e.g., the name, age, gender, or the like) of a user and a mobile phone number as transmission destination user terminal information.

Upon acceptance of the user information, the user registration processing part 181 newly generates user ID different from any of the user ID already stored in the user ID storing part 110. In this exemplary embodiment, the user registration processing part 181 generates, as user ID, a value as the result of adding 1 to the maximum value of the user ID stored in the user ID storing part 110. The user registration processing part 181 executes a process (a user registration process) of causing the user ID storing part 110 to store the generated user ID and the accepted user information in association with each other.

The user ID storing part 110 according to the second exemplary embodiment stores user ID, group ID, and user information including transmission destination user terminal information in association with each other.

In a case that user ID that is not stored in association with group ID is stored in the user ID storing part 110, the group determining part 182 generates group ID for the user ID, and causes the user ID storing part 110 to store the generated group ID and the user ID in association with each other.

At this moment, the group determining part 182 generates group ID so that the number of user ID stored in the user ID storing part 110 in association with one group ID is an upper limit number that is previously set (in this exemplary embodiment, three) or less. That is to say, the group determining part 182 causes the user ID storing part 110 to store group ID and transmission destination user terminal information in association with each other so that the number of users included in one group is an upper limit number that is previously set or less.

According to this configuration, it is possible to more securely prevent the data amount of a distribution information list transmitted from the server device 100 to each of the user terminals 200 . . . from becoming too large. That is to say, the information distribution system 1 regulates the value of the upper limit number, thereby being capable of regulating a relation between the degree of anonymity of activity information and the data amount of a distribution information list (regulating a trade off).

In a case that group ID is generated by the group determining part 182, the group ID transmitting part 183 transmits the group ID to the user terminals 200 . . . specified by transmission destination user terminal information stored in the user ID storing part 110 in association with the group ID.

The distribution information storing part 140 in the second exemplary embodiment previously stores distribution information and a provision condition in association with each other. A provision condition includes information representing a region (the range of a location). In this exemplary embodiment, a provision condition includes the lower limit value and the upper limit value of latitude and the lower limit value and the upper limit value of longitude.

The distribution information selecting part 150 in the second exemplary embodiment selects distribution information stored in the distribution information storing part 140 in association with a provision condition representing a region including the latitude and longitude (described later) included in activity information, for the activity information.

A function of the user terminal 200 in the second exemplary embodiment includes a group ID receiving part 261, a provisional user ID generating part (a provisional user identifier generating means) 262, and an activity information acquiring part (an activity information acquiring means) 263, in addition to the function of the user terminal 200 according to the first exemplary embodiment. A user terminal other than the user terminal 200 also has the same function as the user terminal 200, and operates in the same manner as the user terminal 200.

The group ID receiving part 261 receives group ID from the server device 100. The group ID receiving part 261 causes the provisional user ID storing part 210 to store the received group ID.

The provisional user ID generating part 262 generates provisional user ID. The group ID receiving part 261 causes the provisional user ID storing part 210 to store the generated provisional user ID.

In this exemplary embodiment, the provisional user ID generating part 262 calculates a hash value of basic information in accordance with MD5 (Message Digest Algorithm 5), thereby generating the calculated hash value as provisional user ID. Consequently, it is possible to sufficiently reduce a possibility that provisional user ID overlaps between users included in a group. In this exemplary embodiment, basic information is a string inputted by a user. Alternatively, basic information may be information (e.g., a telephone number) previously stored in a user terminal.

The activity information acquiring part 263 acquires activity information. In this exemplary embodiment, the activity information acquiring part 263 acquires location information representing the location of each of the user terminals 200 . . . by using GPS (Global Positioning System), as activity information. The activity information acquiring part 263 causes the activity information storing part 220 to store the acquired activity information.
(Operation)

Next, an operation of the information distribution system 1 according to the second exemplary embodiment will be described.

Figure 7:
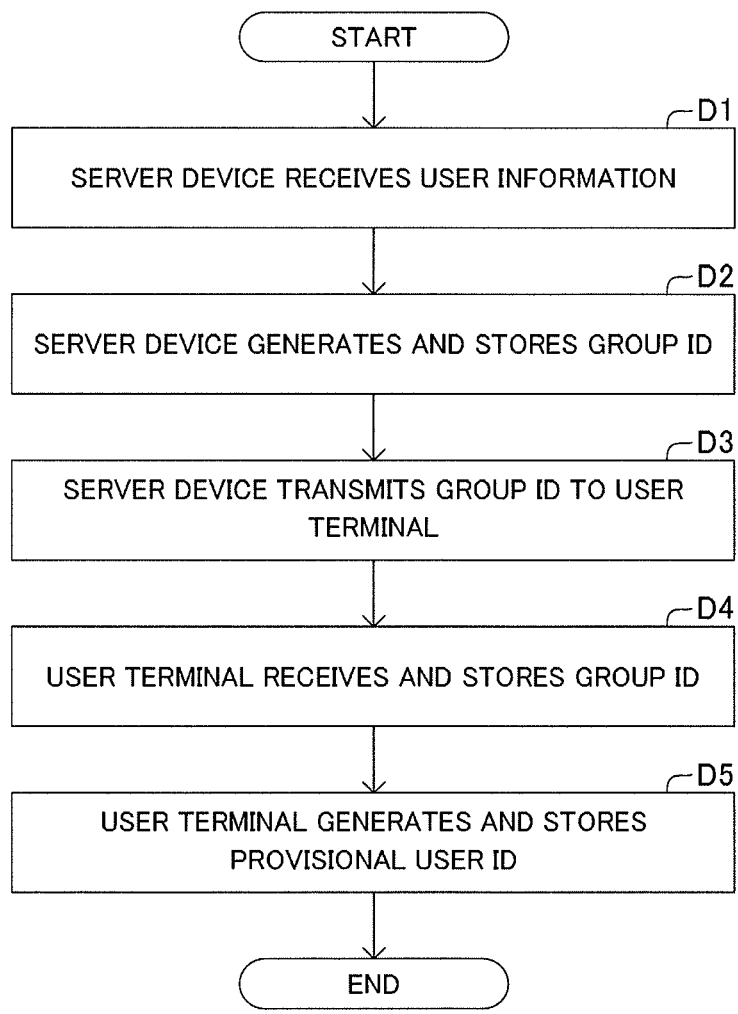
FIG. 7 is a flowchart showing an operation of the information distribution system according to the second exemplary embodiment of the present invention for generating group ID and also generating provisional user ID.

Herein, an operation of the information distribution system 1 when the server device 100 generates group ID and the user terminal 200 generates provisional user ID will be described with reference to a flowchart shown in FIG. 7.

The user registration processing part 181 transmits information (e.g., a web page) for prompting a user to input user information to each of the user terminals 200 . . . . Each of the user terminals 200 . . . accepts input of the user information from the user, and transmits the accepted user information to the server device 100. Thus, the server device 100 receives the user information and thereby accepts the user information (step D1).

Upon acceptance of the user information, the server device 100 newly generates user ID which is different from any of the user ID already stored in the user ID storing part 110, and causes the user ID storing part 110 to store the generated user ID and the accepted user information in association with each other.

For example, in a case that information including the name of "Taro Suzuki," the age of "14," the gender of "male" and the mobile phone number of "09033445566" is inputted as user information and the user ID of "5" is generated for the user information, information that the user ID storing part 110 stores is as shown in FIG. 8.

Next, the server device 100 generates group ID for the user ID newly stored into the user ID storing part 110, and causes the user ID storing part 110 to store the generated group ID in association with the user ID (step D2).

For example, in a case that group ID "1" is generated for user ID having values of "1," "2" and "3" and group ID "2" is generated for user ID having values of "4," "5" and "6," information that the user ID storing part 110 stores is as shown in FIG. 9.

Next, for each of the user ID stored in the user ID storing part 110, the server device 100 transmits (in this exemplary embodiment, pushes) the group ID associated with the user ID to each of the user terminals 200 . . . specified by transmission destination user terminal information associated with the group ID (step D3).

For example, regarding user ID "1," the server device 100 pushes group ID "1" to the user terminal specified by a mobile phone number "09012345678."

Thus, each of the user terminals 200 . . . receives group ID from the server device 100, and causes the provisional user ID storing part 210 to store the received group ID.

For example, each of user terminals specified by transmission destination user terminal information associated with user ID having values of "1," "2" and "3" receives group ID "1," and causes the provisional user ID storing part 210 to store the received group ID (step D4).

Next, each of the user terminals 200 . . . calculates a hash value of basic information and thereby generates the calculated hash value as provisional user ID, and causes the provisional user ID storing part 210 to store the generated provisional user ID (step D5).

For example, in a case that the user whose user ID is "1" inputs a string "1" as basic information, the user terminal generates a hash value of "xMpCOKC514INzFCab3WEmw" as provisional user ID. Therefore, in this case, information that the provisional user ID storing part 210 stores is as shown in FIG. 10.

Herein, an operation of the information distribution system 1 when the user terminal 200 acquires activity information (location information) and transmits the acquired activity information to the server device 100 and the server device 100 transmits distribution information of the vicinity of a location represented by the activity information to the user terminal 200 will be described more specifically.

The activity information acquiring part 263 of the user terminal 200 acquires the latitude and the longitude of the user terminal 200 every time a previously set acquisition period (in this exemplary embodiment, five minutes) elapses. For example, when a user holding the user terminal 200 is near Shibuya around ten to eleven o'clock, the activity information acquiring part 263 acquires activity information including the time of "2009/11/10 10:55," the latitude of "+35.650" and the longitude of "+139.702," and causes the activity information storing part 220 to store (accumulate) the acquired activity information. Therefore, for example, information stored by the activity information storing part 220 is as shown in FIG. 11.

The activity information transmitting part 230 acquires the latest activity information among the activity information stored in the activity information storing part 220. In this exemplary embodiment, the activity information transmitting part 230 acquires activity information including the time of "2009/11/10 10:55," the latitude of "+35.650" and the longitude of "+139.702." Then, the activity information transmitting part 230 transmits the acquired activity information, the group ID and the provisional user ID to the server device 100 (step A1 of FIG. 3).

Figure 3:
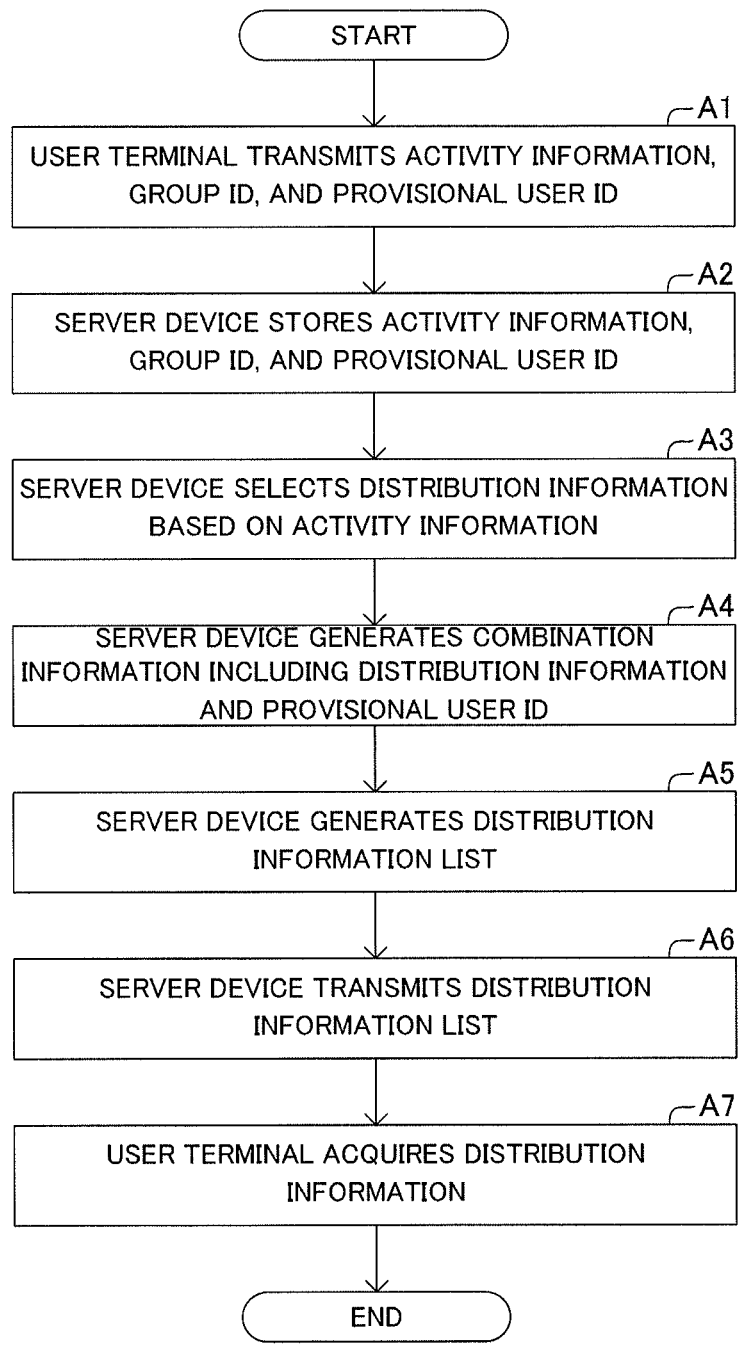
FIG. 3 is a flowchart showing an operation of the information distribution system according to the first exemplary embodiment of the present invention.

Thus, the server device 100 receives the activity information including the time of "2009/11/10 10:55," the latitude of "+35.650" and the longitude of "+139.702," the provisional user ID of "xMpCOKC5141NzFCab3WEmw," and the group ID of "1." The server device 100 causes the activity information storing part 130 to store the activity information, the provisional user ID and the group ID having been received, in association with each other (step A2 of FIG. 3).

When activity information are received from all of the user terminals 200 . . . , information stored by the activity information storing part 130 is, for example, as shown in FIG. 12.

Next, for each of the activity information stored by the activity information storing part 130, based on the activity information, the distribution information selecting part 150 selects distribution information from among the distribution information stored in the distribution information storing part 140 (step A3 of FIG. 3).

To be specific, for activity information, the distribution information selecting part 150 selects distribution information stored in the distribution information storing part 140 in association with a provision condition representing a region including the latitude and the longitude included in the activity information.

FIG. 13 shows information that the distribution information storing part 140 stores. A latitude upper limit is the upper limit value of the latitude, a latitude lower limit is the lower limit value of the latitude, a longitude upper limit is the upper limit value of the longitude, and a longitude lower limit is the lower limit of the longitude.

For example, for the activity information including the latitude of "+35.650" and the longitude of "+139.702," the distribution information selecting part 150 selects "Shibuya area information" as distribution information because the activity information satisfies "35.648"≤"+35.650"≤"35.652" and "139.698"≤"+139.702"≤"139.702."

Then, for each of the activity information stored in the activity information storing part 130, the distribution information selecting part 150 generates combination information including the selected distribution information and the provisional user ID stored in the activity information storing part 130 in association with the activity information based on which the distribution information has been selected (step A4 of FIG. 3). Next, the distribution information selecting part 150 causes the combination information storing part 160 to store the generated combination information and the group ID stored in the activity information storing part 130 in association with the activity information based on which the combination information has been generated.

Consequently, for example, information stored by the combination information storing part 160 is as shown in FIG. 14.

Next, the distribution information transmitting part 170 generates a distribution information list (step A5 of FIG. 3). To be specific, the distribution information transmitting part 170 receives a distribution request including user ID from each of the user terminals 200 . . . . Then, the distribution information transmitting part 170 acquires the user ID included in the distribution request (step B1 of FIG. 4).

Figure 4:
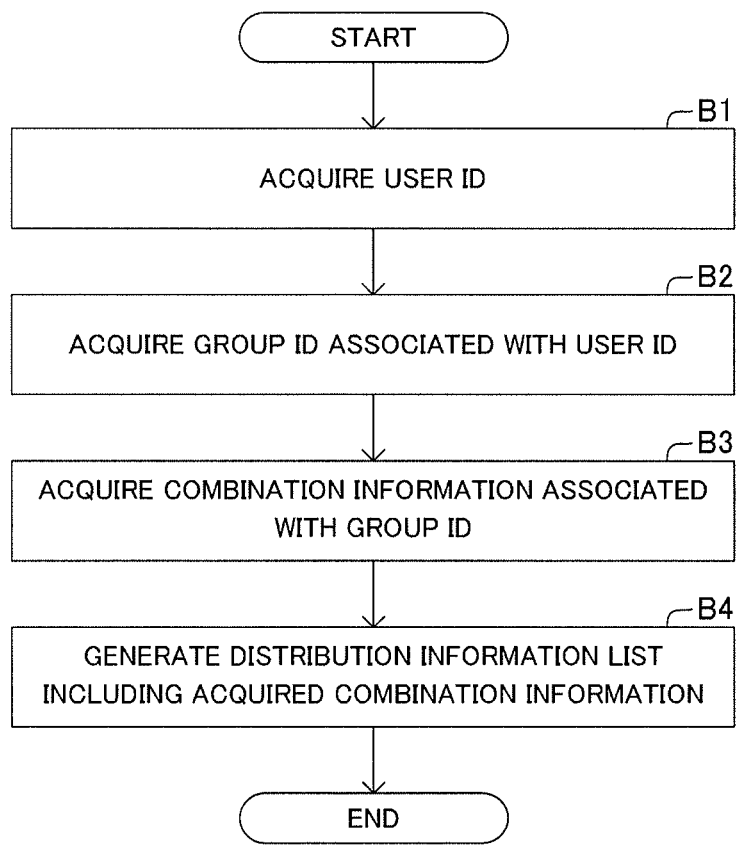
FIG. 4 is a flowchart showing an operation of a server device according to the first exemplary embodiment of the present invention for generating a distribution information list.

Next, the distribution information transmitting part 170 acquires the group ID stored in the user ID storing part 110 in association with the acquired user ID (step B2 of FIG. 4). For example, in a case that the acquired user ID is "1," the distribution information transmitting part 170 acquires group ID "1."

Then, the distribution information transmitting part 170 acquires all of the combination information stored in the combination information storing part 160 in association with the acquired group ID (step B3 of FIG. 4). For example, the distribution information transmitting part 170 acquires combination information ("xMpCOKC514INzFCab3WEmw," "Shibuya area information"), combination information ("yB5yjZ1ML2NvBn+JzBSGLA," "Shinjuku area information"), and combination information ("7MvIfktc4v4oMI/Z8qe68w," "Ikebukuro area information").

Next, the distribution information transmitting part 170 generates a distribution information list including the acquired combination information (step B4 of FIG. 4). For example, the distribution information transmitting part 170 generates {("xMpCOKC514INzFCab3WEmw," "Shibuya area information"), ("yB5yjZ1ML2NvBn+JzBSGLA," "Shinjuku area information"), ("7MvIfktc4v4oMI/Z8qe68w," "Ikebukuro area information")}, as a distribution information list for group ID "1" (i.e., for user ID "1").

Then, the distribution information transmitting part 170 transmits (in this exemplary embodiment, pushes) the generated distribution information list to each of the user terminals 200 . . . specified by the transmission destination user terminal information stored in the user ID storing part 110 in association with the group ID "1" (step A6 of FIG. 3). That is to say, in this exemplary embodiment, the distribution information transmitting part 170 transmits the generated distribution information list to the user terminals specified by respective mobile phone numbers "09012345678," "09098765432" and "09043219876."

Next, the distribution information acquiring part 250 receives the distribution information list, and acquires the distribution information based on the provisional user ID (step A7 of FIG. 3).

Figure 5:
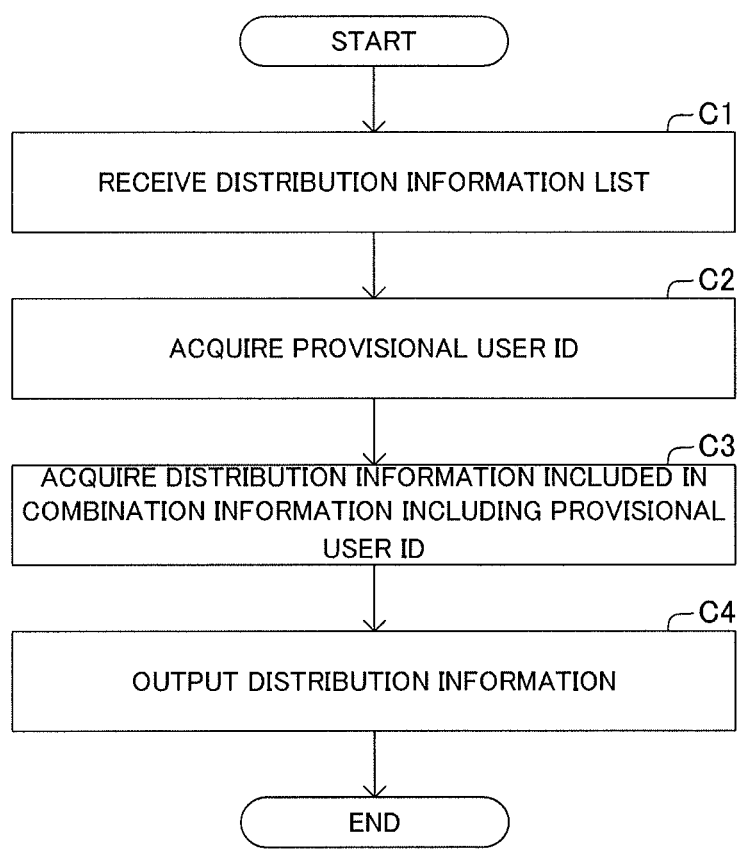
FIG. 5 is a flowchart showing an operation of a user terminal according to the first exemplary embodiment of the present invention for acquiring distribution information.

To be specific, the distribution information receiving part 240 of the user terminal 200 of the user identified by the user ID of "1" receives the distribution information list {("xMpCOKC514INzFCab3WEmw," "Shibuya area information"), ("yB5yjZ1ML2NvBn+JzBSGLA," "Shinjuku area information"), ("7MvIfktc4v4oMI/Z8qe68w," "Ikebukuro area information")} (step C1 of FIG. 5).

Then, the distribution information acquiring part 250 acquires the provisional user ID of "xMpCOKC514INzFCab3WEmw" from the provisional user ID storing part 210 (step C2 of FIG. 5). Next, the distribution information acquiring part 250 acquires the distribution information (i.e., "Shibuya area information") included in the combination information including the acquired provisional user ID from among the combination information included in the received distribution information list (step C3 of FIG. 5).

Then, the distribution information acquiring part 250 outputs the acquired distribution information of "Shibuya area information" via the output device (step C4 of FIG. 5).

As described above, according to the information distribution system in the second exemplary embodiment of the present invention, it is also possible to produce the same actions and effects as in the first exemplary embodiment.

Third Exemplary Embodiment

Figure 15:
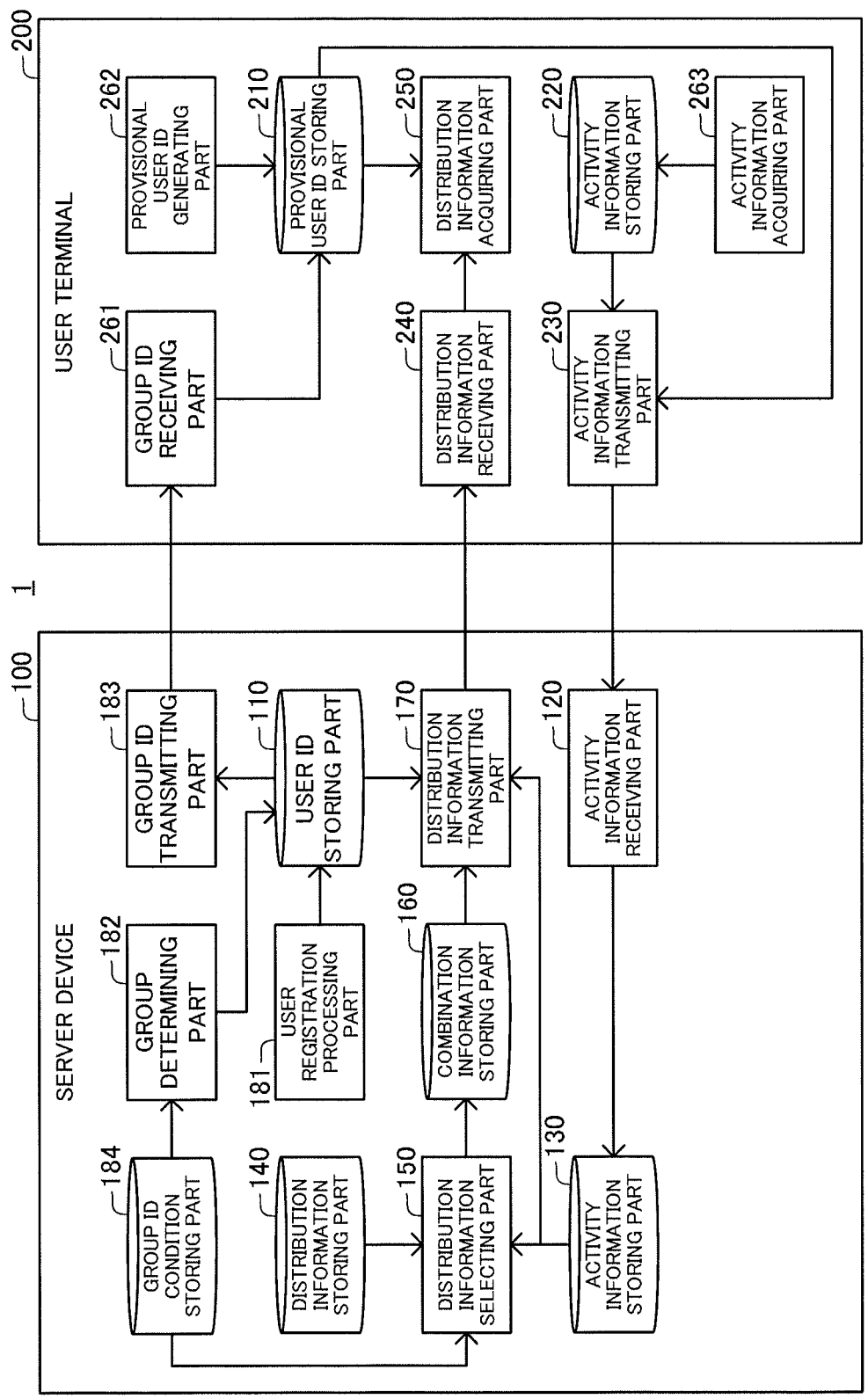
FIG. 15 is a block diagram schematically showing a function of an information distribution system according to a third exemplary embodiment of the present invention.

Next, an information distribution system according to a third exemplary embodiment of the present invention will be described. The information distribution system according to the third exemplary embodiment is different from the information distribution system according to the second exemplary embodiment in being configured so that a user having an attribute associated with a group is included in the group. Therefore, a description will be made below focusing on the different point.
(Function)
A function of the server device 100 in the third exemplary embodiment includes, as shown in FIG. 15, a group ID condition storing part 184 in addition to the function of the server device 100 in the second exemplary embodiment.

The group ID condition storing part 184 stores group ID and an attribute condition in association with each other. An attribute condition includes information defining an attribute that a user included in a group has. In this exemplary embodiment, an attribute condition is information defining a gender and a range of age (i.e., the upper limit value of age (an age upper limit) and the lower limit value of age (an age lower limit)).

In this exemplary embodiment, information stored by the group ID condition storing part 184 is as shown in FIG. 16. That is to say, a gender configuring the attribute condition is "male" or "female," and a range of age configuring the attribute condition is "0-9," "10-19," "20-29," "30-39," "40-49," "50-59," "60-69," "70-79," "80-89" or "90 or more."

The group determining part 182 in the third exemplary embodiment, when the attribute of a user included in user information stored in the user ID storing part 110 satisfies an attribute condition stored in the group ID condition storing part 184, causes the user ID storing part 110 to store the group ID associated with the attribute condition, in association with the user information. That is to say, the group determining part 182 causes the user ID storing part 110 to store the group ID and the transmission destination user terminal information in association with each other so that a user having an attribute associated with a group is included in the group.

For example, as shown in FIG. 8, the gender of the user whose user ID is "1" is "male" and his age is "11-20." Therefore, the group determining part 182 causes the user ID storing part 110 to store group ID "2" in association with the user ID. Accordingly, information that the user ID storing part 110 stores is as shown in FIG. 17.

Further, the distribution information storing part 140 in the third exemplary embodiment previously stores distribution information, a provision condition, and an attribute condition in association with each other. For example, information stored by the distribution information storing part 140 is as shown in FIG. 18.

The distribution information selecting part 150 in the third exemplary embodiment selects distribution information based on the provision condition and the attribute condition stored in the distribution information storing part 140, the activity information stored in the activity information storing part 130, and the attribute condition stored in the group ID condition storing part 184.

To be specific, for activity information, the distribution information selecting part 150 selects distribution information stored in the distribution information storing part 140 in association with a provision condition representing a region including the latitude and longitude (described later) included in the activity information and also in association with an attribute condition corresponding to (in this exemplary embodiment, coincident with) an attribute condition stored in the group ID condition storing part 184 in association with group ID received with the activity condition.

That is to say, for each of the activity information stored in the activity information storing part 130, the distribution information selecting part 150 selects distribution information based on the activity information and an attribute associated with a group identified by group ID received with the activity information.

For example, the distribution information selecting part 150 selects "Shibuya area information for male teenagers" as distribution information for the activity information stored in association with the group ID of "2" and the provisional user ID of "xMpCOKC514INzFCab3WEmw."

Then, for each of the activity information stored in the activity information storing part 130, the distribution information selecting part 150 generates combination information including the selected distribution information and the provisional user ID stored in the activity information storing part 130 in association with the activity information based on which the distribution information has been selected (step A4 of FIG. 3). Next, the distribution information selecting part 150 causes the combination information storing part 160 to store the generated combination information and the group ID stored in the activity information storing part 130 in association with the activity information based on which the combination information has been generated.

Consequently, for example, information stored by the combination information storing part 160 is as shown in FIG. 20.

As described above, according to the information distribution system 1 in the third exemplary embodiment of the present invention, it is possible to produce the same actions and effects as in the second exemplary embodiment.

Further, according to the information distribution system 1 in the third exemplary embodiment, it is also possible to select distribution information based on an attribute associated with a group in addition to activity information. As a result, it is possible to transmit distribution information more appropriate for users to the user terminals 200 . . . of the users.

Fourth Exemplary Embodiment

Figure 21:
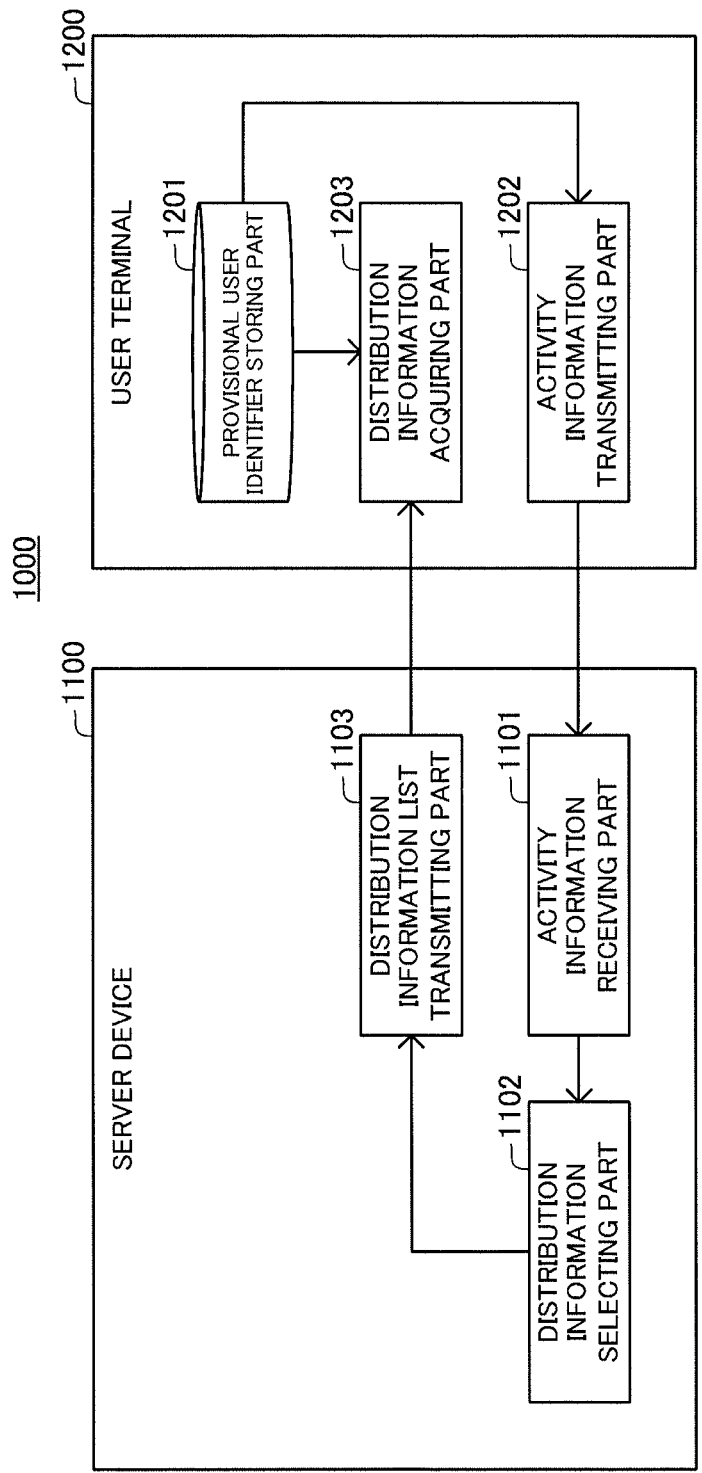
FIG. 21 is a block diagram schematically showing a function of an information distribution system according to a fourth exemplary embodiment of the present invention.

Next, an information distribution system according to a fourth exemplary embodiment of the present invention will be described with reference to FIG. 21.

An information distribution system 1000 according to the fourth exemplary embodiment includes a server device 1100 and a plurality of user terminals 1200 . . . connected so as to be capable of communicating with the server device 1100.

Each of the user terminals 1200 . . . includes:

a provisional user identifier storing part (a provisional user identifier storing means) 1201 configured to store a provisional user identifier that is a provisional identifier for identifying a user; and an activity information transmitting part (an activity information transmitting means) 1202 configured to transmit the stored provisional user identifier, a group identifier for identifying a group including a plurality of users including a user of the user terminal, and activity information representing an activity of the user of the user terminal, to the server device 1100.

The server device 1100 includes:

an activity information receiving part (an activity information receiving means) 1101 configured to receive the provisional user identifier, the group identifier, and the activity information;

a distribution information selecting part (a distribution information selecting means) 1102 configured to, for the received activity information, select distribution information based on the received activity information and also generate combination information including the selected distribution information and the provisional user identifier received with the activity information; and a distribution information list transmitting part (a distribution information list transmitting means) 1103 configured to transmit a distribution information list including the combination information generated based on the activity information received with the group identifier, to each of the user terminals 1200 . . . associated with the group identifier.

Each of the user terminals 1200 . . . further includes a distribution information acquiring part (a distribution information acquiring means) 1203 configured to receive the distribution information list and acquire distribution information included in combination information including the stored provisional user identifier from among the combination information included in the received distribution information list.

According to the above, the server device 1100 does not hold information for associating information (private information) enabling specification of an individual as a user with activity information. Therefore, even if information is leaked from the server device 1100, it is possible to transmit distribution information based on activities of users to the user terminals 1200 . . . while preventing a third party from knowing an activity of a specific user.

Further, for each group, the server device 1100 generates a distribution information list, and also transmits the generated distribution information list to the user terminals 1200 . . . of users included in the group. Therefore, it is possible to prevent the data amount of the distribution information list from becoming too large.

Although the present invention has been described above with reference to the exemplary embodiments, the present invention is not limited to the exemplary embodiments described above. The configuration and details of the present invention can be altered in various manners that can be understood by those skilled in the art within the scope of the present invention.

The respective functions of the information distribution system 1 are realized by the CPU's execution of a program (software) in each of the exemplary embodiments, but may be realized by hardware such as a circuit.

Further, the program is stored in the storage device in each of the exemplary embodiments, but may be stored in a computer-readable recording medium. For example, the recording medium is a portable medium such as a flexible disk, an optical disk, a magneto-optical disk and a semiconductor memory.

Further, as another modified example of each of the exemplary embodiments, any combination of the exemplary embodiments and modified example described above may be employed.

Supplementary Notes

The whole or part of the exemplary embodiments disclosed above can be described as, but not limited to, the following supplementary notes.

(Supplementary Note 1)

An information distribution system, comprising a server device and a plurality of user terminals connected so as to be capable of communicating with the server device, wherein each of the user terminals includes:

a provisional user identifier storing means for storing a provisional user identifier that is a provisional identifier for identifying a user; and an activity information transmitting means for transmitting the stored provisional user identifier, a group identifier for identifying a group including a plurality of users including the user of the user terminal, and activity information representing an activity of the user of the user terminal, to the server device, wherein the server device includes:

an activity information receiving means for receiving the provisional user identifier, the group identifier, and the activity information;

a distribution information selecting means for, for each of the received activity information, selecting distribution information based on the received activity information and also generating combination information including the selected distribution information and the provisional user identifier received with the activity information; and a distribution information list transmitting means for transmitting a distribution information list including the combination information generated based on the activity information received with the group identifier, to each of the user terminals associated with the group identifier, and wherein each of the user terminals further includes a distribution information acquiring means for receiving the distribution information list and acquiring the distribution information included in the combination information including the stored provisional user identifier from among the combination information included in the received distribution information list.

According to the above, the server device does not hold information for associating information (private information) enabling specification of an individual as a user with activity information. Therefore, even if information is leaked from the server device, it is possible to transmit distribution information based on activities of users to the user terminals while preventing a third party from knowing an activity of a specific user.

Further, for each group, the server device generates a distribution information list, and also transmits the generated distribution information list to the user terminals of users included in the group. Therefore, it is possible to prevent the data amount of the distribution information list from becoming too large.

(Supplementary Note 2)

The information distribution system according to Supplementary Note 1, wherein:

the server device includes a terminal specification information storing means for storing the group identifier and terminal specification information for specifying each of the user terminals of the plurality of users included in the group identified by the group identifier, in association with each other; and the distribution information list transmitting means is configured to transmit the distribution information list to each of the user terminals specified by the terminal specification information stored in association with the group identifier.

(Supplementary Note 3)

The information distribution system according to Supplementary Note 2, wherein the terminal specification information storing means is configured to store the group identifier and the terminal specification information in association with each other so that a number of users included in one group is equal to or less than a previously set upper limit number.

According to the above, it is possible to more securely prevent the data amount of a distribution information list transmitted from the server device to the user terminal from becoming too large.

(Supplementary Note 4)

The information distribution system according to Supplementary Note 2 or 3, wherein:

the terminal specification information storing means is configured to store the group identifier and the terminal specification information in association with each other so that a user having an attribute associated with the group is included in the group; and the distribution information selecting means is configured to, for each of the received activity information, select distribution information based on the received activity information and the attribute associated with the group identified by the group identifier received with the activity information.

According to the above, it is possible to select distribution information based on, in addition to activity information, an attribute associated with a group. As a result, it is possible to transmit distribution information more appropriate for a user to a user terminal of the user.

(Supplementary Note 5)

The information distribution system according to any of Supplementary Notes 1 to 4, wherein:

each of the user terminals includes a provisional user identifier generating means for generating the provisional user identifier; and the provisional user identifier storing means is configured to store the generated provisional user identifier.

(Supplementary Note 6)

The information distribution system according to Supplementary Note 5, wherein the provisional user identifier generating means is configured to calculate a hash value of basic information and thereby generate the calculated hash value as the provisional user identifier.

According to the above, it is possible to sufficiently decrease a possibility that a provisional user identifier overlaps between users included in a group.

(Supplementary Note 7)

The information distribution system according to any of Supplementary Notes 1 to 6, wherein:

each of the user terminals includes an activity information acquiring means for acquiring the activity information; and the activity information transmitting means is configured to transmit the provisional user identifier, the group identifier, and the acquired activity information, to the server device.

(Supplementary Note 8)

The information distribution system according to Supplementary Note 7, wherein the activity information acquiring means is configured to acquire, as the activity information, location information representing a location of the user terminal by using GPS (Global Positioning System).

(Supplementary Note 9)

An information distribution method applied to an information distribution system including a server device and a plurality of user terminals connected so as to be capable of communicating with the server device, the information distribution method comprising:

by each of the user terminals, transmitting a provisional user identifier stored in a storage device for storing a provisional user identifier that is a provisional identifier for identifying a user, a group identifier for identifying a group including a plurality of users including the user of the user terminal, and activity information representing an activity of the user of the user terminal, to the server device;

by the server device, receiving the provisional user identifier, the group identifier, and the activity information;

by the server device, for each of the received activity information, selecting distribution information based on the received activity information and also generating combination information including the selected distribution information and the provisional user identifier received with the activity information;

by the server device, transmitting a distribution information list including the combination information generated based on the activity information received with the group identifier, to each of the user terminals associated with the group identifier; and by each of the user terminals, receiving the distribution information list and acquiring the distribution information included in the combination information including the stored provisional user identifier from among the combination information included in the received distribution information list.

(Supplementary Note 10)

The information distribution method according to Supplementary Note 9, comprising:

by the server device, causing a storage device to store the group identifier and terminal specification information for specifying each of the user terminals of the plurality of users included in the group identified by the group identifier, in association with each other; and by the server device, transmitting the distribution information list to each of the user terminals specified by the terminal specification information stored in the storage device in association with the group identifier.

(Supplementary Note 11)

The information distribution method according to Supplementary Note 10, comprising, by the server device, causing the storage device to store the group identifier and the terminal specification information in association with each other so that a number of users included in one group is equal to or less than a previously set upper limit number.

(Supplementary Note 12)

The information distribution method according to Supplementary Note 10 or 11, comprising:

by the server device, causing the storage device to store the group identifier and the terminal specification information in association with each other so that a user having an attribute associated with the group is included in the group; and by the server device, for each of the received activity information, selecting distribution information based on the received activity information and the attribute associated with the group identified by the group identifier received with the activity information.

(Supplementary Note 13)

A server device connected so as to be capable of communicating with each of a plurality of user terminals, the server device comprising:

an activity information receiving means for receiving a provisional user identifier that is a provisional identifier for identifying a user, a group identifier for identifying a group including a plurality of users, and activity information representing an activity of the user;

a distribution information selecting means for, for each of the received activity information, selecting distribution information based on the received activity information and also generating combination information including the selected distribution information and the provisional user identifier received with the activity information; and a distribution information list transmitting means for transmitting a distribution information list including the combination information generated based on the activity information received with the group identifier, to each of the user terminals associated with the group identifier.

(Supplementary Note 14)

The server device according to Supplementary Note 13, comprising:

a terminal specification information storing means for storing the group identifier and terminal specification information for specifying each of the user terminals of the plurality of users included in the group identified by the group identifier, in association with each other, wherein the distribution information list transmitting means is configured to transmit the distribution information list to each of the user terminals specified by the terminal specification information stored in association with the group identifier.

(Supplementary Note 15)

The server device according to Supplementary Note 14, wherein the terminal specification information storing means is configured to store the group identifier and the terminal specification information in association with each other so that a number of users included in one group is equal to or less than a previously set upper limit number.

(Supplementary Note 16)

The server device according to Supplementary Note 14 or 15, wherein:

the terminal specification information storing means is configured to store the group identifier and the terminal specification information in association with each other so that a user having an attribute associated with the group is included in the group; and the distribution information selecting means is configured to, for each of the received activity information, select distribution information based on the received activity information and the attribute associated with the group identified by the group identifier received with the activity information.

(Supplementary Note 17)

A computer-readable recording medium storing an information distribution program comprising instructions for causing a server device connected so as to be capable of communicating with each of a plurality of user terminals, to realize:

an activity information receiving means for receiving a provisional user identifier that is a provisional identifier for identifying a user, a group identifier for identifying a group including a plurality of users, and activity information representing an activity of a user;

a distribution information selecting means for, for each of the received activity information, selecting distribution information based on the received activity information and also generating combination information including the selected distribution information and the provisional user identifier received with the activity information; and a distribution information list transmitting means for transmitting a distribution information list including the combination information generated based on the activity information received with the group identifier, to each of the user terminals associated with the group identifier.

(Supplementary Note 18)

The recording medium according to Supplementary Note 17, wherein:

the information distribution program further comprises instructions for causing the server device to realize a terminal specification information storage processing means for causing a storage device to store the group identifier and terminal specification information for specifying each of user terminals of the plurality of users included in the group identified by the group identifier, in association with each other; and the distribution information list transmitting means is configured to transmit the distribution information list to each of the user terminals specified by the terminal specification information stored in the storage device in association with the group identifier.

(Supplementary Note 19)

The recording medium according to Supplementary Note 18, wherein the terminal specification information storage processing means is configured to cause the storage device to store the group identifier and the terminal specification information in association with each other so that a number of users included in one group is equal to or less than a previously set upper limit number.

(Supplementary Note 20)

The recording medium according to Supplementary Note 18 or 19, wherein:

the terminal specification information storage processing means is configured to cause the storage device to store the group identifier and the terminal specification information in association with each other so that a user having an attribute associated with the group is included in the group; and the distribution information selecting means is configured to, for each of the received activity information, select distribution information based on the received activity information and the attribute associated with the group identified by the group identifier received with the activity information.

(Supplementary Note 21)

A user terminal connected so as to be capable of communicating with a server device, the user terminal comprising:

a provisional user identifier storing means for storing a provisional user identifier that is a provisional identifier for identifying a user;

an activity information transmitting means for transmitting the stored provisional user identifier, a group identifier for identifying a group including a plurality of users including the user of the user terminal, and activity information representing an activity of the user of the user terminal, to the server device; and a distribution information acquiring means for receiving a distribution information list including a plurality of combination information each including a provisional user identifier and distribution information from the server device, and acquiring distribution information included in combination information including the stored provisional user identifier from among the combination information included in the received distribution information list.

(Supplementary Note 22)

A computer-readable recording medium storing an information acquisition program comprising instructions for causing a user terminal connected so as to be capable of communicating with a server device, to realize:

a provisional user identifier storage processing means for causing a storage device to store a provisional user identifier that is a provisional identifier for identifying a user;

an activity information transmitting means for transmitting the stored provisional user identifier, a group identifier for identifying a group including a plurality of users including the user of the user terminal, and activity information representing an activity of the user of the user terminal, to the server device; and a distribution information acquiring means for receiving a distribution information list including a plurality of combination information each including a provisional user identifier and distribution information from the server device and acquiring distribution information included in combination information including the stored provisional user identifier from among the combination information included in the received distribution information list.

The present invention is based upon and claims the benefit of priority from Japanese patent application No. 2010-099344, filed on Apr. 23, 2010, the disclosure of which is incorporated herein in its entirety by reference.

INDUSTRIAL APPLICABILITY

The present invention can be applied to an information distribution system configured to transmit distribution information from a server device to a user terminal.

DESCRIPTION OF REFERENCE NUMERALS 1 information distribution system
100 server device
110 user ID storing part
120 activity information receiving part
130 activity information storing part
140 distribution information storing part
150 distribution information selecting part
160 combination information storing part
170 distribution information transmitting part
181 user registration processing part
182 group determining part
183 group ID transmitting part
184 group ID condition storing part
200 . . . user terminals
210 provisional user ID storing part
220 activity information storing part
230 activity information transmitting part
240 distribution information receiving part
250 distribution information acquiring part
261 group ID receiving part
262 provisional user ID generating part
263 activity information acquiring part
1000 information distribution system
1100 server device
1101 activity information receiving part
1102 distribution information selecting part
1103 distribution information list transmitting part
1200 . . . user terminals
1201 provisional user identifier storing part
1202 activity information transmitting part
1203 distribution information acquiring part

The invention claimed is:

1. An information distribution system, comprising a server device and a plurality of user terminals connected so as to communicate with the server device,
wherein each of the user terminals comprises a CPU, the CPU of the each user terminal including:
a provisional user identifier storing unit for storing a provisional user identifier that is a provisional identifier for identifying a user; and
an activity information transmitting unit for transmitting the stored provisional user identifier, a group identifier for identifying a group including a plurality of users including the user of the user terminal, and activity information representing an activity of the user of the user terminal, to the server device,
wherein the server device comprises a CPU, the CPU of the server device including:
an activity information receiving unit for receiving the provisional user identifier, the group identifier, and the activity information;
a distribution information selecting unit for, for each of the received activity information, selecting distribution information based on the received activity information and also generating combination information including the selected distribution information and the provisional user identifier received with the activity information; and
a distribution information list transmitting unit for transmitting a distribution information list generated so as to correspond to the group identifier respectively and including a plurality of pieces of the combination information generated based on the activity information received with the group identifier, to each of a plurality of the user terminals associated with the group identifier, and
wherein the CPU of each of the user terminals further includes a distribution information acquiring unit for receiving the distribution information list and acquiring the distribution information included in the combination information including the stored provisional user identifier from among a plurality of pieces of the combination information included in the received distribution information list.

2. The information distribution system according to claim 1, wherein:
the server device includes a terminal specification information storing unit for storing the group identifier and terminal specification information for specifying each of the user terminals of the plurality of users included in the group identified by the group identifier, in association with each other; and
the distribution information list transmitting unit is configured to transmit the distribution information list to each of the user terminals specified by the terminal specification information stored in association with the group identifier.

3. The information distribution system according to claim 2, wherein the terminal specification information storing unit is configured to store the group identifier and the terminal specification information in association with each other so that a number of users included in one group is equal to or less than a previously set upper limit number.

4. The information distribution system according to claim 2, wherein:
the terminal specification information storing unit is configured to store the group identifier and the terminal specification information in association with each other so that a user having an attribute associated with the group is included in the group; and
the distribution information selecting unit is configured to, for each of the received activity information, select distribution information based on the received activity information and the attribute associated with the group identified by the group identifier received with the activity information.

5. The information distribution system according to claim 1, wherein:
each of the user terminals includes a provisional user identifier generating unit for generating the provisional user identifier; and
the provisional user identifier storing unit is configured to store the generated provisional user identifier.

6. The information distribution system according to claim 5, wherein the provisional user identifier generating unit is configured to calculate a hash value of basic information and thereby generate the calculated hash value as the provisional user identifier.

7. The information distribution system according to claim 1, wherein:
each of the user terminals includes an activity information acquiring unit for acquiring the activity information; and
the activity information transmitting unit is configured to transmit the provisional user identifier, the group identifier, and the acquired activity information, to the server device.

8. An information distribution method applied to an information distribution system including a server device and a plurality of user terminals connected so as to communicate with the server device, the information distribution method comprising:
by each of the user terminals, transmitting a provisional user identifier stored in a storage device for storing a provisional user identifier that is a provisional identifier for identifying a user, a group identifier for identifying a group including a plurality of users including the user of the user terminal, and activity information representing an activity of the user of the user terminal, to the server device;
by the server device, receiving the provisional user identifier, the group identifier, and the activity information;
by the server device, for each of the received activity information, selecting distribution information based on the received activity information and also generating combination information including the selected distribution information and the provisional user identifier received with the activity information;
by the server device, transmitting a distribution information list generated so as to correspond to the group identifier respectively and including a plurality of pieces of the combination information generated based on the activity information received with the group identifier, to each of a plurality of the user terminals associated with the group identifier; and
by each of the user terminals, receiving the distribution information list and acquiring the distribution information included in the combination information including the stored provisional user identifier from among a plurality of pieces of the combination information included in the received distribution information list.

9. A server device connected so as to communicate with each of a plurality of user terminals, the server device comprising:
an activity information receiving unit for receiving a provisional user identifier that is a provisional identifier for identifying a user, a group identifier for identifying a group including a plurality of users, and activity information representing an activity of the user;
a distribution information selecting unit for, for each of the received activity information, selecting distribution information based on the received activity information and also generating combination information including the selected distribution information and the provisional user identifier received with the activity information; and
a distribution information list transmitting unit for transmitting a distribution information list generated so as to correspond to the group identifier respectively and including a plurality of pieces of the combination information generated based on the activity information received with the group identifier, to each of a plurality of the user terminals associated with the group identifier.

* * * * *